(12) United States Patent
Sung

(10) Patent No.: US 9,684,059 B2
(45) Date of Patent: Jun. 20, 2017

(54) DEVICE FOR ESTIMATING LOCATION AND METHOD FOR ESTIMATING LOCATION BY USING UPLINK ACCESS POINT

(71) Applicant: WIFIVE.CO.,LTD, Daejeon (KR)

(72) Inventor: Tae-Kyung Sung, Daejeon (KR)

(73) Assignee: WIFIVE.CO.,LTD, Daejeon (KR)

( * ) Notice: Subject to any disclaimer, the term of this patent is extended or adjusted under 35 U.S.C. 154(b) by 209 days.

(21) Appl. No.: 14/435,909

(22) PCT Filed: Oct. 18, 2013

(86) PCT No.: PCT/KR2013/009325
§ 371 (c)(1),
(2) Date: Apr. 15, 2015

(87) PCT Pub. No.: WO2014/065539
PCT Pub. Date: May 1, 2014

(65) Prior Publication Data
US 2015/0268326 A1    Sep. 24, 2015

(30) Foreign Application Priority Data

Oct. 22, 2012    (KR) .................. 10-2012-0117028

(51) Int. Cl.
*G01S 5/06* (2006.01)
*G01S 5/02* (2010.01)
*H04W 64/00* (2009.01)
*H04W 4/04* (2009.01)

(52) U.S. Cl.
CPC ........ *G01S 5/06* (2013.01); *G01S 5/02* (2013.01); *H04W 4/04* (2013.01); *H04W 64/00* (2013.01)

(58) Field of Classification Search
CPC .................................. H04W 4/04; G01S 5/06
USPC ........... 342/442, 445, 450; 455/456.5, 456.6, 455/561, 562.1
See application file for complete search history.

(56) References Cited

U.S. PATENT DOCUMENTS 6,173,014 B1 * 1/2001 Forssen ................ H04B 7/0845
375/267
7,724,191 B2    5/2010 Kim et al.
(Continued)

FOREIGN PATENT DOCUMENTS

JP        4093792       6/2008
JP      2009076048      4/2009
(Continued)

OTHER PUBLICATIONS

International Search Report—PCT/KR2013/009325 dated Jan. 17, 2014.
(Continued)

*Primary Examiner* — Kamran Afshar
*Assistant Examiner* — Farideh Madani
(74) *Attorney, Agent, or Firm* — STIP Law Group, LLC

(57) ABSTRACT

Provided are a device and a method for position estimation using an uplink access point, and more particularly, a device and a method for position estimation capable of estimating a position of a user terminal by allowing an uplink access point including at least two antennas to receive signals transmitted from the user terminal and using a phase difference between the received signals.

18 Claims, 5 Drawing Sheets

(56) References Cited

U.S. PATENT DOCUMENTS

| | | | | |
|---|---|---|---|---|
| 8,754,751 | B1* | 6/2014 | Picolli | G01S 13/75 340/10.1 |
| 2006/0194553 | A1* | 8/2006 | Ozaki | G01R 29/10 455/226.1 |
| 2009/0232023 | A1* | 9/2009 | Soffer | H01Q 3/26 370/254 |
| 2010/0070368 | A1* | 3/2010 | Choi | G06Q 30/0261 705/14.58 |
| 2011/0110293 | A1* | 5/2011 | Hart | G01S 5/0009 370/328 |
| 2012/0075145 | A1* | 3/2012 | Kee | G01S 3/74 342/442 |
| 2012/0249371 | A1* | 10/2012 | Nguyen | G01S 1/68 342/442 |
| 2012/0319906 | A1* | 12/2012 | Hikino | H01Q 1/243 343/700 MS |
| 2013/0002489 | A1* | 1/2013 | Erad | H01Q 21/29 342/432 |
| 2013/0237255 | A1* | 9/2013 | Shinada | G01C 17/38 455/456.6 |

FOREIGN PATENT DOCUMENTS

| | | |
|---|---|---|
| KR | 1020020080548 | 10/2002 |
| KR | 100775858 | 11/2007 |
| KR | 1020080084011 | 9/2008 |
| KR | 1020090012601 | 2/2009 |
| KR | 1020110126938 | 11/2011 |
| KR | 1020120015000 | 2/2012 |

OTHER PUBLICATIONS

Park et al., Direction-of-Arrival Tracking in WLAN Network Using Dual Antenna Access Points, 2012 International Conference on Indoor Positioning and Indoor Navigation, Nov. 13-15, 2012, Sydney, Australia.

Park et al., Performance Analysis of DOA using Dual Antenna, 2012 National Conference Korea GNSS Society, Nov. 8, 2012, Jeju Island, Republic of Korea.

Park et al., Direction-of-Arrival structure and network signaling in WLAN AP, Conference Guide of International Symposium on GPS/GNSS 2012, Oct. 30-Nov. 2, 2012, Xi'an, China.

\* cited by examiner

DEVICE FOR ESTIMATING LOCATION AND METHOD FOR ESTIMATING LOCATION BY USING UPLINK ACCESS POINT

TECHNICAL FIELD

The present invention relates to a device and a method for position estimation using an uplink access point, and more particularly, to a device and a method for position estimation capable of estimating a position of a user terminal by allowing an uplink access point including at least two antennas to receive signals transmitted from the user terminal and using a phase difference between the received signals.

BACKGROUND ART

A wireless based position system uses wireless LAN (WLAN), wireless fidelity (Wi-Fi), a wireless broadband internet, world interoperability for microwave access, a high speed downlink packet access (HSDPA), Zigbee, Bluetooth, ultra-wideband (UWB), infrared data association (IrDA), ultra wild band, shared wireless access protocol (SWAP), long term evolution (LTE), and the like, which have been widely used, and therefore is considerably effective in costs.

A wireless network which is a part of communication infrastructure may implement a position system using a notebook computer, a PDA, a smart phone, or other wireless mobile devices and a software based position solution is remarkably cheaper than a position tracking structure which is used only in the interior of room.

Wireless based positioning technologies according to the related art generally use various methods to relatively triangulate a position. A standard for wireless position solutions is not yet present, each solution is specialized for a vendor and thus uses an independent Patent technology, and detailed matters for determining a position of a user are not yet published.

A general technology for indoor position estimation according to the related art may be classified into a cell ID method which recognizes cell identification of an access point, a multilateral positioning method using a received signal strength indicator (RSSI) which calculates a position based on a difference in signal strength between base stations, a radio frequency (RF) fingerprint method using radio wave strengths for each position, and the like.

The cell ID method may have a large error, the multilateral positioning method using an RSSI may have a reduced throughput due to interference between signals at several access points and an increased infrastructure cost burden, and the RF fingerprint method may have large calculations and may be sensitive to a change in environment.

Korean Patent No. 10-0775858 (Application No.: 10-2006-109443, filing date: Nov. 7, 2006) discloses a system and a method for environment analysis for indoor wireless location.

However, the above-mentioned methods may not perform the efficient positioning compared to costs.

DISCLOSURE

Technical Problem

An object of the present invention is to efficiently perform indoor positioning with relatively small costs.

Technical Solution

In one general aspect, a device for position estimation using an uplink access point includes: a user terminal 300; and an uplink access point 400 including a first antenna and a second antenna and receiving an uplink signal transmitted from the user terminal 300 through the first antenna or the second antenna, wherein a position of the user terminal 300 is estimated using a phase difference between carrier waves reaching the first antenna and the second antenna from the user terminal 300.

A Wi-Fi type or a Bluetooth type may be used to transmit and receive the uplink signal.

At least one of the plurality of uplink access points 400 may not have a wired connection for data communication.

A distance between the two antennas may be equal to or less than 0.5 times of a wavelength of the carrier wave.

A distance between the two antennas may be equal to or more than 0.25 times of a wavelength of the carrier wave and may be equal to or less than 0.5 times of the wavelength of the carrier wave.

A distance between the two antennas may be 0.5 times of a wavelength of the carrier wave.

A distance between the two antennas may be equal to or more than 0.5 times of a wavelength of the carrier wave and may be equal to or less than the wavelength of the carrier wave and the uplink access point 400 may be equal to or more than two.

A distance between the two antennas may be equal to or more than 0.5 times of a wavelength of the carrier wave and may be equal to or less than the wavelength of the carrier wave and the user terminal 300 may further include an inertial sensor or a geomagnetic sensor.

The uplink access point 400 may further include an auxiliary antenna, and the first antenna, the second antenna, and the auxiliary antenna may be disposed on a straight line.

The uplink access point 400 may further include a third antenna, the first antenna, the second antenna, and the third antenna may not be disposed on a straight line, and a phase difference between the first antenna and the second antenna may be measured to measure an incident angle in a specific one direction of the user terminal 300 and a phase difference between the first antenna and the third antenna may be measured to measure an incident angle in another direction so as to estimate a position on a two-dimensional plane.

The uplink signal may include a unique identifier of the user terminal 300.

A distance between the user terminal 300 and the first antenna or the second antenna may be estimated by measuring strength of the uplink signal.

The position of the user terminal 300 may be estimated by further using height information of the first antenna or the second antenna and height information of the user terminal 300.

The device may further include: a positioning server 500 transmitting map information, shop information, and other information including at least one of goods discount information of each shop around the user terminal 300 to the user terminal 300.

In another general aspect, a method for position estimation using a device for position estimation includes a user terminal 300 and an uplink access point 400 including a first antenna and a second antenna and receiving an uplink signal transmitted from the user terminal 300 through the first antenna or the second antenna, the method includes: allocating an individual frequency use time to each user terminal 300 by allowing the uplink access point 400 to communicate with the user terminals 300 for a contention period in the overall communication period; and transmitting, by each user terminal 300, carrier waves for the individual frequency use time allocated to the user terminal 300 and measuring, by the uplink access point 400, a phase difference between the carrier waves received by the first antenna and the second antenna, for a contention restriction period in the overall communication period.

In still another general aspect, an uplink access point 400 includes a first antenna and a second antenna and receiving uplink signals transmitted from the user terminal 300 through the first antenna or the second antenna and estimating a position of the user terminal 300 using a phase difference between the received uplink signals, wherein the uplink access point 400 further includes an auxiliary antenna, and the first antenna, the second antenna, and the auxiliary antenna are disposed on a straight line.

In still another general aspect, a device for position estimation includes: at least one user terminal 300 wirelessly transmitting positional identification information including a unique identifier; and an uplink access point 400 wirelessly transmitting at least one positional identification information selected from a unique identifier, a generation time of a signal, a time interval at which the signal is periodically transmitted, a communication rate and function, and an access point (AP) type, wirelessly receiving the positional identification information of the user terminal 300, measuring an angle of arrival of the signal using an uplink signal, and measuring a distance using a received signal strength indicator (RSSI) so as to estimate a position, wherein the uplink is a communication link used to transmit the signal from the user terminal 300 to the uplink access point 400.

The uplink access point 400 may include: at least two antennas 410 wireless receiving positional information from the user terminal; a signal acquisition controller 420 connected to the antenna 410 and storing user terminal information among information input to the antenna and a signal of a time period; a signal processor 430 connected to the signal acquisition controller 420 and measuring a time difference of arrival of the signal reaching the antenna and measuring the RSSI of the signal reaching the antenna; and an information processor 440 connected to the signal processor 430 and calculating an angle of arrival using the time difference of arrival of the information reaching the antenna and calculating a distance of arrival using the RSSI information.

The device may further include: a positioning server 500 receiving the positional information estimated by the uplink access point 400 and information including a unique identifier of the user terminal 300 from the uplink access point and transmitting the positional information to the user terminal 300.

Advantageous Effects

According to the exemplary embodiments of the present invention, it is possible to efficiently perform the indoor positioning with the relatively small costs.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
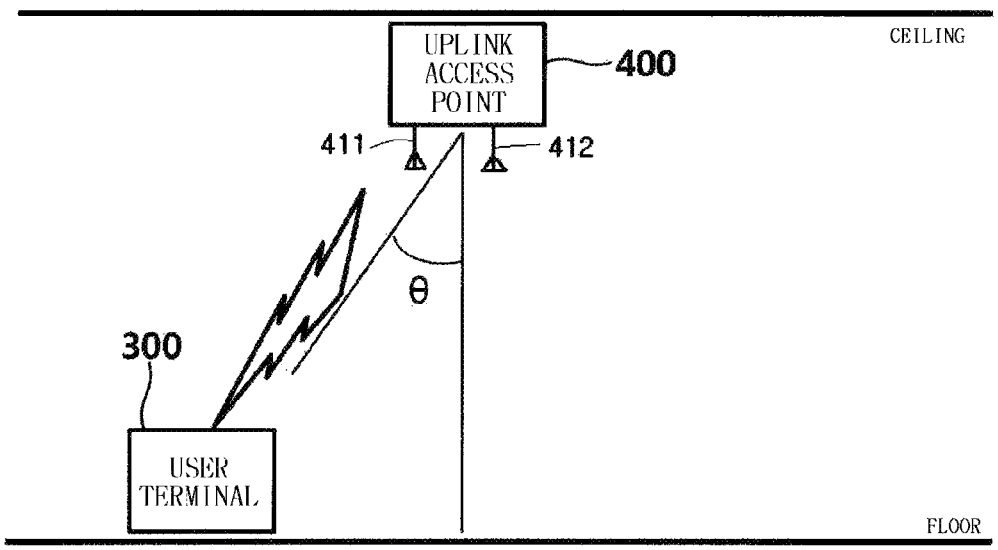
FIG. 1 is a conceptual diagram of a device for position estimation according to an exemplary embodiment of the present invention.

300: User terminal
400: Uplink access point
410: Antenna
411: First antenna
412: Second antenna
414: Auxiliary antenna
420: Signal acquisition controller
430: Signal processor
440: Information processor

BEST MODE

Hereinafter, a device and a method for position estimation according to exemplary embodiments of the present invention will be described below in detail with reference to the accompanying drawings.

Figure 2:
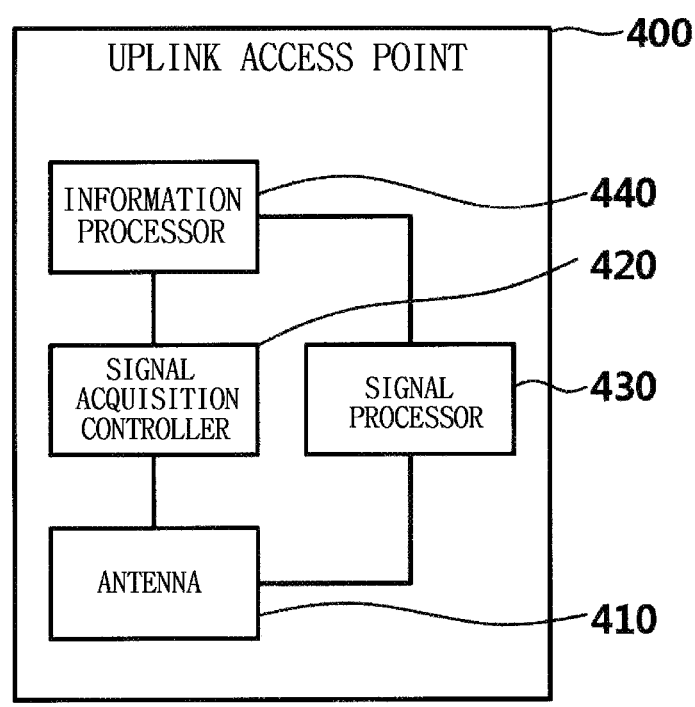
FIG. 2 is a block diagram of an uplink access point of the device for position estimation according to the exemplary embodiment of the present invention.
Figure 3:
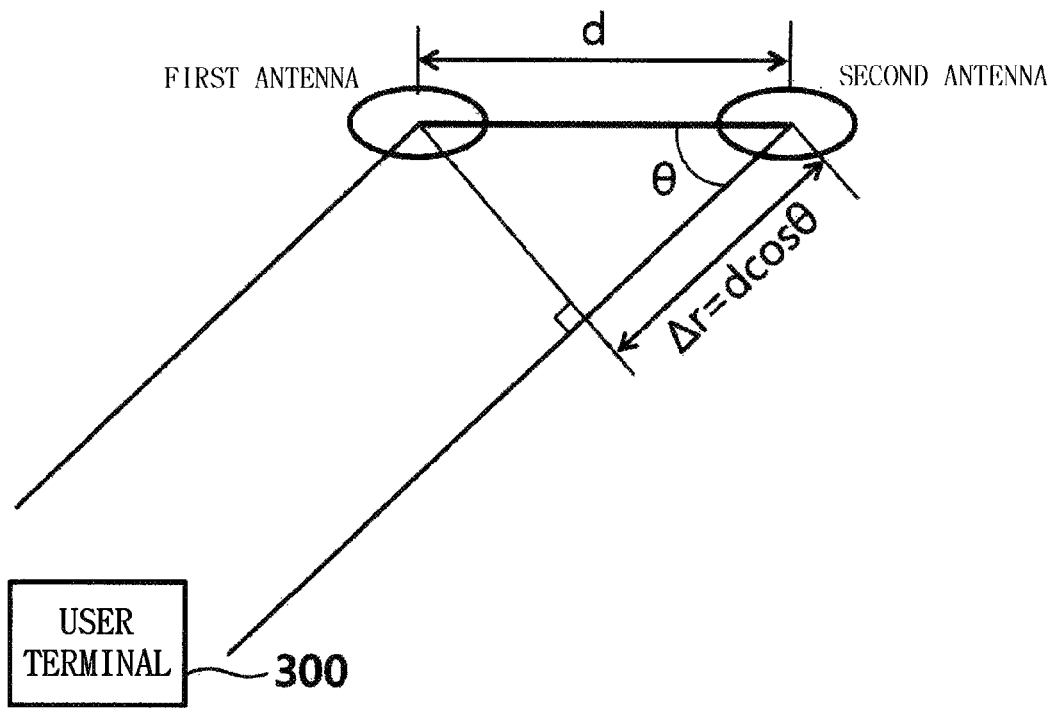
FIG. 3 is an exemplified diagram for position estimation when an antenna of the device for position estimation according to the exemplary embodiment of the present invention is two.
Figure 4:
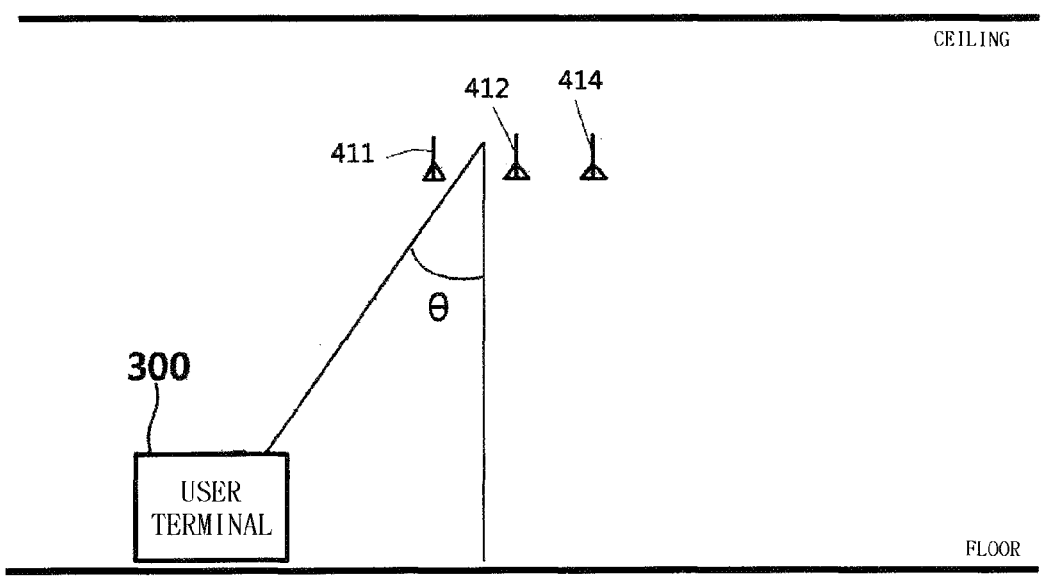
FIG. 4 is an exemplified diagram of a case in which an auxiliary antenna is added to FIG. 3.
Figure 5:
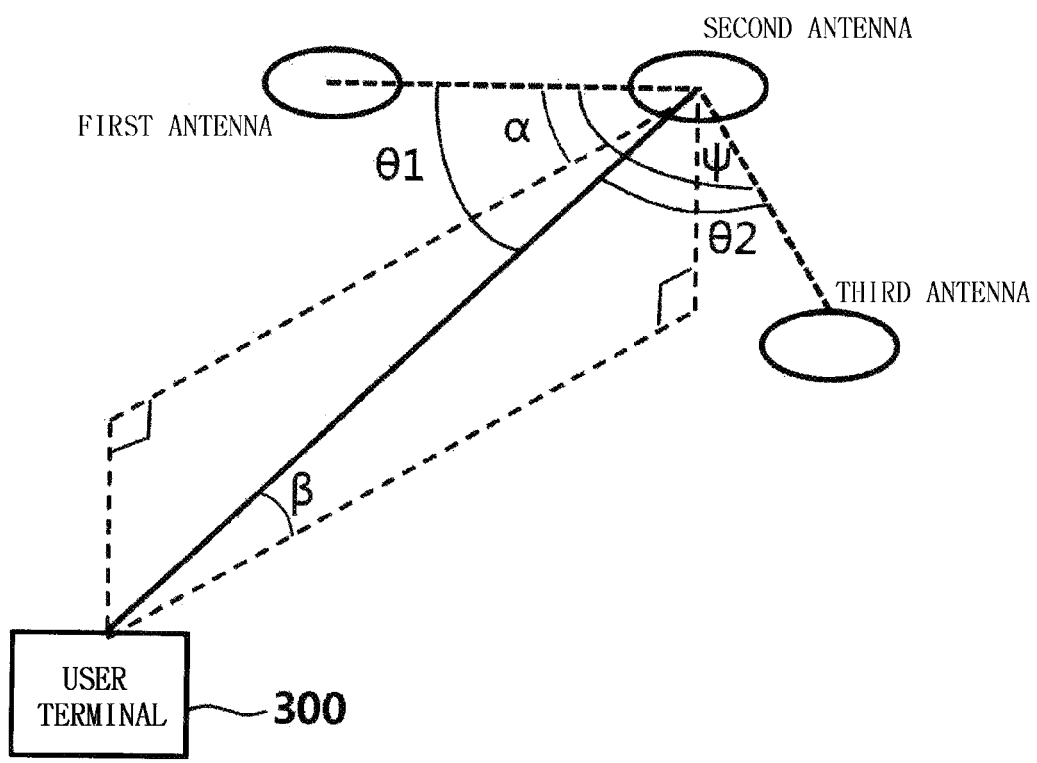
FIG. 5 is an exemplified diagram for angle of arrival estimation when the number of antennas of the device for position estimation according to the exemplary embodiment of the present invention is three.
Figure 6:
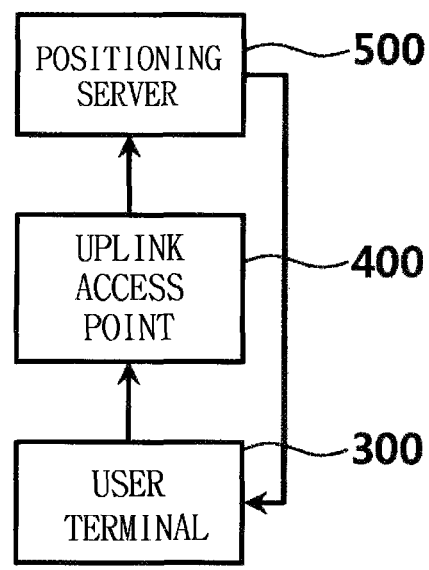
FIG. 6 is a block diagram of the device for position estimation including a positioning server according to the exemplary embodiment of the present invention.

FIG. 1 is a conceptual diagram of a device for position estimation according to an exemplary embodiment of the present invention, FIG. 2 is a block diagram of an uplink access point of the device for position estimation according to the exemplary embodiment of the present invention, FIG. 3 is an exemplified diagram for position estimation when an antenna of the device for position estimation according to the exemplary embodiment of the present invention is two, FIG. 4 is an exemplified diagram of a case in which an auxiliary antenna is added to FIG. 3, FIG. 5 is an exemplified diagram for angle of arrival estimation when the number of antennas of the device for position estimation according to the exemplary embodiment of the present invention is three, and FIG. 6 is a block diagram of the device for position estimation including a positioning server according to the exemplary embodiment of the present invention.

As illustrated in FIG. 1, the device for position estimation according to the exemplary embodiment of the present invention is configured to include a user terminal 300 and an uplink access point 400.

The user terminal 300 may be configured of a device for wirelessly transmitting positional identification information, such as a unique identifier (for example, a telephone number of a user terminal or a unique number of a user terminal device). In this configuration, the user terminal 300 may be a smart phone, a mobile device, a position estimation dedicated terminal, and the like.

That is, the smart phone includes a device for receiving a wireless signal from an access point, inertial sensors such as an acceleration sensor and a gyro sensor, other control devices, and therefore may be used as the user terminal 300.

The typical smart phone generally includes a geomagnetic sensor in addition to the inertial sensor and therefore the user terminal 200 may use the geomagnetic sensor in addition to an inertial sensing unit to more accurately estimate a position. When the device for position estimation (for example, a GPS system) does not receive positional information, a technology of estimating a current position using DR sensors such as the inertial sensing unit or the geomagnetic sensor is a known technology and therefore the detailed description thereof will be omitted.

Further, the typical smart phone has a Wi-Fi communication function and a Bluetooth communication function and therefore when a wireless communication type according to the exemplary embodiment of the present invention is set to be a Wi-Fi type, a Bluetooth communication type, the typical smart phone may be used as the user terminal 300 according to the exemplary embodiment of the present invention. The uplink access point of the Wi-Fi type or the uplink access point of the Bluetooth type may be easily installed inside a building using the related art. That is, the uplink access point 400 may be installed at appropriate places for positioning which are selected as small as possible.

In this case, the uplink access point is connected to an external communication network (for example, Internet network) to use the Wi-Fi type or the Bluetooth type, such that the uplink access point may be implemented to enable the user terminal 300 to provide data communication with the external communication network and the uplink access point receives an uplink signal transmitted only from the user terminal 300 without being connected to the external communication network to use information on the uplink signal, such that the uplink access point may be implemented to be used as a purpose for estimating the position of the user terminal 300.

Herein, the reason why the access point 400 is called the uplink access point is that the access point 400 essentially includes a configuration to transmit a signal from the user terminal 300 to the access point 400, that is, transmitting the uplink signal. The access point according to the related art is generally connected to external devices in a wired manner to transmit and receive data transmitted and received to and from the user terminal to the external devices again, but the uplink access point 400 according to the exemplary embodiment of the present invention may receive the uplink signal required to estimate the position of the terminal and transmit the information on the uplink signal to the user terminal 300 again and therefore need not be connected to other external devices in a wired manner for data communication with the external devices. Therefore, when the uplink access point 400 according to the exemplary embodiment of the present invention is installed, the connection of only a power line is required and the wired connection for data communication with other external devices is not required, and therefore the uplink access point 400 may be simply installed.

Therefore, the exemplary embodiment of the present invention may be characterized in that a plurality of uplink access points 400 are provided and at least one of the uplink access points 400 does not require the wired connection for data communication.

The uplink access point 400 wirelessly transmits at least one positional identification information selected from a unique identifier, a generation time of a signal, a time interval at which the signal is periodically transmitted, a communication rate and function, wirelessly receives the positional identification information of the user terminal 300, measures an angle of arrival of a signal using the uplink signal, and measures a distance using a received signal strength indication (RSSI), thereby estimating a position.

Herein, the uplink means a communication link used to transmit a signal from the user terminal 300 to the uplink access point 400.

The uplink access point 400 communicates with the plurality of user terminals 300 and therefore the user terminal may transmit the uplink signal including the unique identifier (for example, a telephone number of a user terminal, a serial number of a user terminal device, and the like).

The uplink access point 400 communicates with the plurality of user terminals 300 and therefore requires a method for preventing a plurality of signals from colliding with each other. Describing in more detail, when the uplink signals are simultaneously transmitted from several user terminals 300, the uplink access point 400 may not measure the angle of arrival of the signal due to the interference between the uplink signals, and therefore sets a contention restriction period in the overall communication period to generate carrier waves in a time zone (independent frequency use time) in which each of the user terminal 300 may generate the uplink signal in the contention restriction period. When the uplink access point 400 measures a phase difference between the carrier waves using two antennas, the uplink access point 400 may estimate the position of the user terminal 300. Each user terminal 300 competitively communicates with the uplink access point 400 for the contention period in the overall communication period, and thus each of the user terminals 300 informs that the user terminal 300 is in communication coverage with the uplink access point 400 and is allocated with the independent frequency use time from the uplink access point 400.

The uplink access point 400 wirelessly transmits the information required for the user terminal 300 for the contention restriction period in the overall communication period and wirelessly transmits the information required for the user terminal 300 for the contention period, thereby preventing the collision between the user terminal 300 and the uplink access point 400. That is, the positional information of the user terminal 300 estimated by the uplink access point 400 may be transmitted to the user terminal 300 for the contention restriction period.

As illustrated in FIG. 2, the uplink access point 400 may be configured to include an antenna 410, a signal acquisition controller 420, a signal processor 430, and an information processor 430.

The antenna 410 wirelessly receives the positional information from the user terminal and includes a first antenna 411 and a second antenna 412.

The antenna 410 may determine a positional information transmitting range of the user terminal 300 according to the installation method.

TH signal acquisition controller 420 is connected to the antenna 410 and stores the information and the signal in a time period which are input to the antenna In this case, the time period information is set to be a magnitude in the signal to be stored and a length considering a time delay in which the signal may be generated. That is, a maximum delay difference of a signal of arrival and the length information of the signal need to be determined in advance.

The signal processor 430 is connected to the signal acquisition controller 420 and measures a time difference of arrival of the signal reaching the antenna and measures the RSSI of the signal reaching the antenna. In this case, the RSSI may be acquired by allowing the antenna to measure received power.

The information processor 440 is connected to the signal processor 430 and calculates the angle of arrival using the time difference of arrival of the information reaching the antenna and calculates the distance using the RSSI information.

As illustrated in FIG. 3, the time difference of arrival of the information may be obtained using the information of the time period input to the information input unit 420 and the angle of arrival may be calculated using the obtained time difference of arrival.

Describing in more detail, in the case in which the number of antennas 410 is two, when the results of performing fast Fourier transform (FFT) on the signal acquired by the two antennas are set to be R1(f) and R2(f), the uplink access point 400 may obtain the phase difference based on the following Equation 1, may obtain the angle of arrival based on the following Equation 2, and may obtain the distance based on the following Equation 3.

$$G_{12}(f) = R_1^*(f)R_2(f) \quad \text{[Equation 1]}$$
$$= |G_{12}(f)|e^{j\varphi(i)}$$
$$= |R_1||R_2|e^{j(\varphi_2(i)-\varphi_1(f))}$$

$$\Delta\varphi(f) = \varphi_2(f) - \varphi_1(f)$$
$$= \frac{2\pi\Delta r}{\lambda}$$
$$= \frac{2\pi f}{c} \cdot d\cos\theta(f)$$

$$\theta(f) = \cos^{-1}\left[\Delta\varphi(f)/\left(\frac{2\pi f d}{c}\right)\right] \quad \text{[Equation 2]}$$

$$X = r\sin\theta \quad \text{[Equation 3]}$$

In other words, the distance and the angle of arrival are obtained in a 2D form using the single uplink access point 400 configured of the two antennas in geographical features having a simple and narrow structure such as a corridor, thereby estimating the position of the user terminal 300.

Herein, in order for the uplink access point 400 to prevent ambiguity which occurs for each multiple length of a wavelength when a wavelength of a signal is shorter than the distance between the two antennas, the distance between the antennas (distance between the first antenna and the second antenna) need not to be longer than the wavelength of the signal (carrier wave). However, as the distance between the antennas is short, a phase angle difference in response to the change in the angle of arrival is small, and therefore it is difficult to accurately measure the angle of arrival. That is, as the distance between the antennas is short, the accuracy of the measurement of the angle of arrival is reduced.

Therefore, to maximum the phase angle difference in response to the change in the angle of arrival without the ambiguity, the distance between the antennas may be set to be a half (0.5 times) of the wavelength of the signal (carrier wave). As the distance between the antennas is short, the accuracy of the measurement of the angle of arrival is reduced, but the accuracy of the measurement of the angle of arrival up to the half of the distance between the antennas may be reliable. Therefore, the preferred distance between the antennas may be set to be equal to or more than 0.25 times of the wavelength of the signal (carrier wave) and may be set to be equal to or less than 0.5 times of the wavelength of the signal (carrier wave).

If an approach direction of the user terminal 300 is known in advance by the method of using several uplink access points 400, the method of allowing the user terminal 300 to use a pedestrian dead reckoning (PDR) sensor, or the like (that is, it is previously known whether the user terminal 300 is accessed from the right or accessed from the left in FIG. 1), even though the distance between the antennas is set to be equal to the wavelength of the signal (carrier wave), the ambiguity may essentially occur. Even in this case, to maximum the phase angle difference in response to the change in the angle of arrival without the ambiguity, the distance between the antennas may be set to be equal to the wavelength of the signal (carrier wave). As the distance between the antennas is short, the accuracy of the measurement of the angle of arrival is reduced, but the accuracy of the measurement of the angle of arrival up to the half of the distance between the antennas may be reliable. Therefore, the preferred distance between the antennas may be set to be equal to or more than 0.5 times of the wavelength of the signal (carrier wave) and may be set to be equal to or less than the wavelength of the signal (carrier wave). However, even in this case, there is a need to know the approach direction of the user terminal 300 in advance by the method of using at least two uplink access points 400, the method of allowing the user terminal 300 to use the PDR sensor, or the like.

In the case in which at least two uplink access points 400 are used, when the first uplink access point 400 stops receiving the signal and the second uplink access point 400 starts to receive the signal, it may be appreciated that the user terminal 300 moves from the first uplink access point 400 to the second uplink access point 400.

Further, the PDR sensor means a pedestrian DR sensor and the DR sensor means a device for estimating a current position using the inertial sensor (acceleration sensor, an angular acceleration sensor, and the like) in the device when the reception of the positional information stops. Therefore, to allow the user terminal 300 to estimate the approach direction using the PDR sensor, the inertial sensor needs to be further provided inside the user terminal 300. When the smart phone is used as the user terminal 300, the PDR sensor may be implemented using the inertial sensor in the smart phone.

As illustrated in FIG. 4, an auxiliary antenna 414 to prevent the ambiguity in addition to the first antenna 411 and the second antenna 412 may be installed and the first antenna 411, the second antenna 412, and the auxiliary antenna 414 may be disposed on a straight line.

For example, when the distance between the first antenna 411 and the second antenna 412 is set to be the wavelength of the signal (carrier wave) and the distance between the second antenna 412 and the auxiliary antenna 414 is set to be 0.5 times of the wavelength of the signal (carrier wave), the phase difference between the signals (carrier waves) received by the second antenna 412 and the auxiliary antenna 414 may estimate from which direction the user terminal 300 approaches and the accurate angle of arrival may be measured based on the phase difference between the first antenna 411 and the second antenna 412.

When the ambiguity problem is solved using the auxiliary antenna 414, the distance between the first antenna and the second antenna may be set to be very long and therefore an incident angle may be more accurately measured.

As illustrated in FIG. 5, when the number of antennas 410 is at least three and each antenna is not positioned on a straight line, the uplink access point 400 may obtain each of the angle of altitude and the azimuth α and β based on the following Equation 4.

$$\cos(\theta_1) = \cos(\alpha)\cos(\beta)$$

$$\cos(\theta_s) = \cos(\psi-\alpha)\cos(\beta) \quad \text{[Equation 4]}$$

When coordinates xs, ys, and zs of the antenna of the uplink access point 400 are known and the distance r from the antenna of the uplink access point 400 to the user terminal 300 is known, coordinates xu, yu, and zu of the user terminal 300 may be obtained based on the following Equation 5.

$$x_s - x_u = r \cos \alpha \cos \beta$$

$$y_s - y_u = r \sin \alpha \cos \beta$$

$$z_s - z_u = r \sin \beta \quad \text{[Equation 5]}$$

In other words, the distance, the angle of altitude, and the azimuth are obtained in a 3D form using the one uplink access point 400 configured of at least three antennas (antenna including the first antenna, the second antenna, and the third antenna) in geographical features having a complicated structure such as a wide plaza, and therefore the position of the user terminal 300 may be estimated. In this case, when the angle of arrival in an x direction is measured based on the phase difference measured using the first antenna and the second antenna and the angle of arrival in a y direction is measured based on the phase difference measured using the second antenna and a third antenna, a connection line between the first antenna and the second antenna and a connection line between the second antenna and the third antenna may be vertical to accurately measure xy coordinates of the user terminal 300 as maximum as possible. Further, since the signal (carrier wave) uses the same frequency, the distance between the first antenna and the second antenna may be equal to the distance between the second antenna and the third antenna. Therefore, the first antenna, the second antenna, and the third antenna may be positioned at apexes of a rectangular equilateral triangle.

However, even though the first antenna, the second antenna, and the third antenna are not be positioned at apexes of the rectangular equilateral triangle, the position measurement in the xy direction on the straight line may be made. That is, when the first antenna, the second antenna, and the third antenna are not positioned on the straight line, the incident angle in a specified one direction of the user terminal 300 is measured by measuring the phase difference between the first antenna and the second antenna and the incident angle is measured in another direction by measuring the phase difference between the first antenna and the third antenna, thereby estimating the position on a 2D plane.

The distance r from the antenna of the uplink access point 400 to the user terminal 300 may also be estimated based on the strength of the signal reaching the antenna of the uplink access point 400 from the user terminal 300. That is, as the distance is increased, the strength of the signal reaching the antenna is weak, and therefore when the strength of the signal is measured, the distance may be estimated.

Further, when a height of the user terminal 300 is known in advance, the positions of the coordinates xu, yu, and zu of the user terminal 300 may be known only by the angle of altitude and the azimuth α and β. The user of each of the user terminals 300 may input the height of the user terminal 300 in advance (for example, when the user is considered to carry the user terminal at a height of 1 m 40 cm, the height of the user terminal may be input as 1 m 40 cm) and when the user's age and sex of the user terminal 300 are input, the height of the user terminal 300 may also be estimated based on the information (that is, an average height of users having the age and the sex may be obtained and the height of the user terminal expected to be carried by the user having the average height may be estimated).

As illustrated in FIG. 6, the device for position estimation may be configured to further include a positioning server 500 which receives the positional information estimated by the uplink access point 400 and the information including the unique identifier of the user terminal 300 from the uplink access point 400 and transmits the positional information to the user terminal 300.

The positional server 500 may receive the positional information of the user terminal 300 calculated by the uplink access point 400 and then transmit the positional information to the user terminal 300, but may receive only the measurement results from the uplink access point 400 and calculate the position of the user terminal 300 and transmit the calculated positional information to the user terminal 300. Alternatively, the positioning server 500 receiving only the incident angle information calculated by the uplink access point 400 may calculate the position of the user terminal 300 and may also transmit the calculated positional information to the user terminal 300.

When the positional information is transmitted to the user terminal 300, the positional information may be transmitted to the user terminal 300 along with map information, shop information, and other information such as goods discount information of each shop around the user terminal 300.

Alternatively, the positional information, the measurement result information, the incident angle information, and the like are directly transmitted from the uplink access point 400 to the user terminal 300 (when only the measurement result information or the incident angle information is transmitted to the user terminal 300, the user terminal needs to perform the position calculation), and the positioning server 500 may also be configured to transmit map information, shop information, and other information such as goods discount information of each shop around the user terminal 300, other than the positional information, to the user terminal 300.

As the method for transmitting the information calculated by the uplink access point 400 to the user terminal 300, there may be, for example, a method for directly transmitting information using the user terminal 300, a method for transmitting general information using a general commercial Wi-Fi access point, and a method for transmitting information through external 3G and 4G networks.

In the case of the method for directly transmitting information using the user terminal 300, the information may be directly transmitted.

In the case of the method for transmitting general information using the general commercial Wi-Fi access point and the method for transmitting information through the external 3G and 4G networks, since the information calculated while the user terminal 300 continuously performs the position estimation is transmitted through the positioning server 500, the burden to the user terminal 300 is small, but since the uplink access point 400 to transmit the information through the positioning server 500 is not known, the unique identifier is confirmed by the uplink access point 400 managing the information on the uplink access point 400 and then the information needs to be transmitted. To this end, before the uplink access point 400 uses the user terminal 300, the information on the user terminal 300 needs to be registered in the server.

When the positioning server is not configured, the uplink access point 400 may directly transmit the calculated angle of arrival and distance to the user terminal 300 via the wireless LAN (WLAN) in the contention restriction period. When the positioning server is configured, the calculated angle of arrival and distance may pass through the positioning server 500 via other communications such as WiBro, WiMAX, and LTE and may be transmitted to the user terminal 300.

In other words, when the positioning server 500 is not configured, the uplink access point 400 may transmit the directly calculated angle of arrival and distance through the WLAN and the user terminal 300 may acquire the calculated information. When the positioning server 500 is configured, the relevant information of the user terminal 300 is previously registered in the positioning server 500 and then the uplink access point 400 transmits the calculated angle of arrival and distance to the positioning server 500 through the external communication networks (WiBro, LTE, commercial Wi-Fi, and the like), the positioning server 500 may receive the calculated angle of arrival and distance from the external communication networks to confirm user equipment of the user terminal 300 requiring the calculated information and transmit the calculated angle of arrival and distance as the unique identifier, and the user terminal 300 may receive the calculated information.

The exemplary embodiment of the present invention performs the positioning using the dedicated uplink access point 400 for positioning to reduce installation costs and maintenance costs and estimate the position of the user terminal 300 using only the one uplink access point 400.

The device for position estimation may be used for a pedestrian path guide. That is, when the map information and the positional information are given to the user terminal 300, the device for position estimation may be used for the surrounding geographic guide, the path guide, and the like. To provide the map information to the user terminal 300, a separate server may also be installed and the separate server may also be the positioning server 500.

The present invention is not limited to the above-mentioned exemplary embodiments, and may be variously applied, and may be variously modified without departing from the gist of the present invention claimed in the claims.

The invention claimed is:

1. A device for position estimation using an uplink access point, comprising:
a user terminal; and
an uplink access point including a first antenna and a second antenna and receiving an uplink signal transmitted from the user terminal through the first antenna or the second antenna,
wherein a phase difference between carrier waves reaching the first antenna and the second antenna from the user terminal is measured, and an incident angle of the uplink signal transmitted from the user terminal is calculated using the phase difference,
wherein a position of the user terminal is estimated using the incident angle, height information of the first antenna or the second antenna, and height information of the user terminal, and
wherein, when signals acquired by the first antenna and the second antenna are fast Fourier transformed by $R_1(f)$ and $R_2(f)$, respectively, the uplink access point obtains the phase difference, $\Delta\phi$, based on the following Equation 1, an angle of arrival, $\theta$, based on the following Equation 2, and a distance of arrival, X, based on the following Equation 3, $$G_{12}(f) = \qquad \text{[Equation 1]}$$
$$R_1^*(f)R_2(f) = |G_{12}(f)|e^{j\phi(f)} = |R_1||R_2|e^{j(\phi_2(f)-\phi_1(f))}$$
$$\Delta\phi(f) = \phi_2(f) - \phi_1(f) = \frac{2\pi\Delta r}{\lambda} = \frac{2\pi f}{c} \cdot d\cos\theta(f)$$

wherein d is a distance between the first and the second antennas, $\Delta r$ is the distance difference from the first and the second antennas of the uplink access point to the user terminal, $\lambda$ is a wavelength of the signals, and c is a speed of light $$\theta(f) = \cos^{-1}\left[\Delta\phi(f) \Big/ \left(\frac{2\pi fd}{c}\right)\right] \qquad \text{[Equation 2]}$$

$$X = r \sin\theta \qquad \text{[Equation 3]}.$$

2. The device of claim 1, wherein a Wi-Fi type or a Bluetooth type is used to transmit and receive the uplink signal.

3. The device of claim 1, wherein the uplink access point comprises multiple uplink access points and wherein at least one of the multiple uplink access points does not have a wired connection for data communication.

4. The device of claim 1, wherein a distance between the first antenna and the second antenna is equal to or less than 0.5 times of a wavelength of a carrier wave.

5. The device of claim 1, wherein a distance between the first antenna and the second antenna is equal to or more than 0.25 times of a wavelength of a carrier wave and is equal to or less than 0.5 times of the wavelength of the carrier wave.

6. The device of claim 1, wherein a distance between the first antenna and the second antenna is 0.5 times of a wavelength of a carrier wave.

7. The device of claim 1, wherein a distance between the first antenna and the second antenna is equal to or more than 0.5 times of a wavelength of a carrier wave and is equal to or less than the wavelength of the carrier wave and the uplink access point is equal to or more than two.

8. The device of claim 1, wherein a distance between the first antenna and the second antenna is equal to or more than 0.5 times of a wavelength of a carrier wave and is equal to or less than the wavelength of the carrier wave and the user terminal further includes an inertial sensor or a geomagnetic sensor.

9. The device of claim 1, wherein the uplink access point further includes an auxiliary antenna, and the first antenna, the second antenna, and the auxiliary antenna are disposed on a straight line.

10. The device of claim 1, wherein the uplink access point further includes a third antenna, the first antenna, the second antenna, and the third antenna are not disposed on a straight line, and a phase difference between the first antenna and the second antenna is measured to measure an incident angle in a specific one direction of the user terminal and a phase difference between the first antenna and the third antenna is measured to measure an incident angle in another direction so as to estimate a position on a two-dimensional plane.

11. The device of claim 1, wherein the uplink signal includes a unique identifier of the user terminal.

12. The device of claim 1, wherein a distance between the user terminal and the first antenna or the second antenna is estimated by measuring strength of the uplink signal.

13. The device of claim 1, further comprising: a positioning server transmitting map information, shop information, and other information including at least one of goods discount information of each shop around the user terminal to the user terminal.

14. The device of claim 1, wherein the user terminal comprises multiple user terminals.

15. A method for position estimation using the device of claim 14 for position estimation including a user terminal and an uplink access point including a first antenna and a second antenna and receiving an uplink signal transmitted from the user terminal through the first antenna or the second antenna, the method comprising:
allocating an individual frequency use time to each user terminal by allowing the uplink access point to communicate with the user terminals for a contention period in an overall communication period; and
transmitting, by each user terminal, carrier waves for the individual frequency use time allocated to the user terminal and
measuring, by the uplink access point, a phase difference between the carrier waves received by the first antenna and the second antenna, for a contention restriction period in the overall communication period.

16. The device of claim 1, wherein the uplink access point includes a first antenna and a second antenna and receives uplink signals transmitted from the user terminal through the first antenna or the second antenna and estimates a position of the user terminal using a phase difference between the received uplink signals, wherein the uplink access point further includes: an auxiliary antenna, and the first antenna, the second antenna, and the auxiliary antenna are disposed on a straight line.

17. A device for position estimation, comprising:
at least one user terminal wirelessly transmitting positional identification information including a unique identifier; and
an uplink access point wirelessly transmitting at least one positional identification information selected from a unique identifier, a generation time of a signal, a time interval at which the signal is periodically transmitted, a communication rate and function, and an access point (AP) type, wirelessly receiving the positional identification information of the user terminal, measuring an angle of arrival of the signal using an uplink signal, and measuring a distance using a received signal strength indicator (RSSI) so as to estimate a position,
wherein the signal is transmitted from the user terminal to the uplink access point,
wherein the uplink access point includes:
at least two antennas wireless receiving positional information from the user terminal;
a signal acquisition controller connected to the at least two antennas and storing user terminal information among information input to the at least two antennas and a signal of a time period;
a signal processor connected to the signal acquisition controller and measuring a time difference of arrival of the signal reaching the at least two antennas and measuring the RSSI of the signal reaching the at least two antennas; and
an information processor connected to the signal processor and calculating an angle of arrival using the time difference of arrival of the signal reaching the at least two antennas and calculating a distance of arrival using the RSSI,
wherein when there are two antennas and signals acquired by the two antennas are fast Fourier transformed by $R_1(f)$ and $R_2(f)$, respectively,
the uplink access point obtains the phase difference, $\Delta\phi$, based on the following Equation 1, the angle of arrival, $\theta$, based on the following Equation 2, and the distance of arrival, X, based on the following Equation 3, $$G_{12}(f) = R_1^*(f)R_2(f) \quad \text{[Equation 1]}$$
$$= |G_{12}(f)|e^{j\phi(i)}$$
$$= |R_1||R_2|e^{j(\phi_2(f)-\phi_1(f))}$$

$$\Delta\phi(f) = \phi_2(f) - \phi_1(f)$$
$$= \frac{2\pi\Delta r}{\lambda}$$
$$= \frac{2\pi f}{c} \cdot d\cos\theta(f)$$

wherein d is a distance between the two antennas, $\Delta r$ is the distance difference from the two antennas of the uplink access point to the user terminal, $\lambda$ is a wavelength of the signal, and c is a speed of light $$\theta(f) = \cos^{-1}\left[\Delta\phi(f) / \left(\frac{2\pi f d}{c}\right)\right] \quad \text{[Equation 2]}$$

$$X = r\sin\theta \quad \text{[Equation 3].}$$

18. A device for position estimation, comprising:
at least one user terminal wirelessly transmitting positional identification information including a unique identifier;
and an uplink access point wirelessly transmitting at least one positional identification information selected from a unique identifier, a generation time of a signal, a time interval at which the signal is periodically transmitted, a communication rate and function, and an access point (AP) type, wirelessly receiving the positional identification information of the user terminal, measuring an angle of arrival of the signal using an uplink signal, and measuring a distance using a received signal strength indicator (RSSI) so as to estimate a position, wherein the signal is transmitted from the user terminal to the uplink access point,
wherein the uplink access point includes:
at least two antennas wireless receiving positional information from the user terminal;
a signal acquisition controller connected to the at least two antennas and storing user terminal information among information input to the at least two antennas and a signal of a time period;
a signal processor connected to the signal acquisition controller and measuring a time difference of arrival of the signal reaching the at least two antennas and measuring the RSSI of the signal reaching the antenna; and
an information processor connected to the signal processor and calculating an angle of arrival using the time difference of arrival of the signal reaching the at least two antennas and calculating a distance of arrival using the RSSI,
wherein when there are at least three antennas and each antenna is not positioned on a straight line, the uplink access point obtains an altitude angle, $\alpha$ and an azimuth, $\beta$ of each antenna based on the following Equation 4, and calculates a position based on the following Equation 5, $$\cos(\theta_1) = \cos(\alpha)\cos(\beta)$$

$$\cos(\theta_2) = \cos(\psi - \alpha)\cos(\beta) \quad \text{[Equation 4]}$$

$x_s - x_u = r \cos \alpha \cos \beta$ $y_s - y_u = r \sin \alpha \cos \beta$ $z_s - z_u = r \sin \beta$ [Equation 5]

wherein $x_s$, $y_s$, and $z_s$ are coordinates of the at least three antennas of the uplink access point, r is the distance from the at least three antennas of the uplink access point to the user terminal, $x_u$, $y_u$, and $z_u$ are coordinates of the user terminal, and $\theta_1$ and $\theta_2$ are the angles of arrival of the signal to the at least three antennas.

* * * * *